United States Patent

[11] 3,612,658

| [72] | Inventor | Frank H. Slaymaker |
| | | Rochester, N.Y. |
| [21] | Appl. No. | 11,711 |
| [22] | Filed | Feb. 16, 1970 |
| [45] | Patented | Oct. 12, 1971 |
| [73] | Assignee | General Dynamics Corporation |

[54] SIGNAL ANALYZER HAVING VARYING BANDWIDTH RESOLUTION
12 Claims, 5 Drawing Figs.

| [52] | U.S. Cl. | 350/162 SF |
| [51] | Int. Cl. | G02b 27/38 |
| [50] | Field of Search | 350/162, 162 SF |

[56] References Cited
UNITED STATES PATENTS

| 3,088,113 | 4/1963 | Rosenthal | 350/162 SF UX |
| 3,292,148 | 12/1966 | Giuliano et al. | 350/162 SF UX |
| 3,519,331 | 7/1970 | Cutrona et al. | 350/162 |

*Primary Examiner*—John K. Corbin
*Attorney*—Martin Lukacher

ABSTRACT: An optical analyzer is described in which a beam of monochromatic light is modulated by time-varying signals. The modulated beam then passes through a tapered aperture and is imaged in the Fourier transform plane by aspheric optics, such as a spherical and cylindrical lens having like focal lengths. The image displayed in the transform plane simultaneously shows the Fourier components of the signal and the instantaneous value of the time waveform. The frequency resolution varies continuously from one side of the display to the other.

INVENTOR.
FRANK H. SLAYMAKER

BY

ATTORNEY

SIGNAL ANALYZER HAVING VARYING BANDWIDTH RESOLUTION

The present invention relates to signal analyzer systems and particularly to an optical signal analyzer.

The invention is especially suitable for use in systems for analyzing signals having a wide frequency spectrum, such as may be provided by sonar or radio surveillance systems. The invention, however, is generally useful for signal spectrum analysis and may find application in adaptive signal processing.

Spectrum analysis is generally necessary when the signal to be analyzed is unknown (viz there is no a priori information respecting the signal frequency or some other characteristic thereof). In the past, either a bank of fixed tuned analog filters or a scanning filter has been used to make the spectrum analysis. Sampling techniques have also been used whereby signal samples are digitized and the digital information processed in a computer in accordance with the so-called "fast Fourier transform" program. Both the filter and the digital technique have significant drawbacks. Multiple sets of filter banks would be required, or else many scanning filters would be necessary, each operating simultaneously and each having a different bandwidth. In the digital system, several fast computers, each analyzing a different sample length of the signal are required in order to provide information as to the spectrum, particularly in real time. Thus, both the analog electronic and digital systems are complex, bulky and may well be impractical.

It is a feature of this invention to provide broadband signal-processing by optical means, such that the frequency spectrum information is available in varying degrees of resolution, as would be provided by several filter banks, each having different bandwidths. In addition, the invention affords a means for deriving a display of the amplitude of the signal as a function of time, thus it permits simultaneous amplitude analysis and spectrum analysis of the signal over a continuous range of different analyzing bandwidths. Either a plurality of signals may be analyzed, each with a different frequency resolution, or the same signal may be analyzed with a continuous range of different analyzing bandwidths.

It is an object of the invention to provide an improved optical signal analyzer.

It is a further object of the invention to provide a signal analyzer which provides both amplitude versus time and spectrum information respecting the signal under test.

It is a still further object of the invention to provide an improved optical signal analyzer capable of analyzing time and spectral characteristics of a signal without a priori information respecting signal characteristics, this system thus being very effective in analyzing signals of a transient nature.

It is a still further object of the present invention to provide an improved signal analyzer which operates in accordance with optical techniques and provides significant simplifications over electronic systems for the same purpose.

It is a still further object of the present invention to provide an improved optical spectrum analyzer which provides a wide range of frequency resolution.

Briefly described, a signal analyzer in accordance with the invention includes a light source, desirably a laser or other monochromatic light source, which provides light in a beam. The light beam is modulated in accordance with the signal to be analyzed, say by moving a variable density transparency through the beam at a constant rate. An optical system is provided for imaging the modulated beam at a Fourier transform plane. Desirably, aspheric optics are provided, including closely adjacent spherical and cylindrical lenses. Prior to passing into the imaging optics, the beam is processed by passing it through a tapered aperture in order to provide at the transfer plane a simultaneous display of the frequency spectrum components of the signal and the time characteristic thereof. The resolution varies from the edge of the beam which passes through the pointed end of the aperture to the wide aperture portion of the beam from a broad frequency analysis to a very fine frequency analysis. The cylindrical lens which with the spherical lens provides a focus point in the transform plane defines a continuous range of channels in the direction perpendicular to the axis of the cylinder of the cylindrical lens, each channel providing a different analyzing bandwidth. The channel passing through the narrow end of the aperture is an amplitude function of the signal in which the time variation of the light in this channel is a function of the time variation of the original signal amplitude.

The invention itself, both as to its organization and method of operation, as well as additional objects and advantages thereof will become more readily apparent from a reading of the following description in connection with the accompanying drawings in which.

Reference may be had to my U.S. Pat. No. 3,482,101, issued Dec. 2, 1969 for a discussion of Fourier transform relationships in optical systems.

Figure 1:
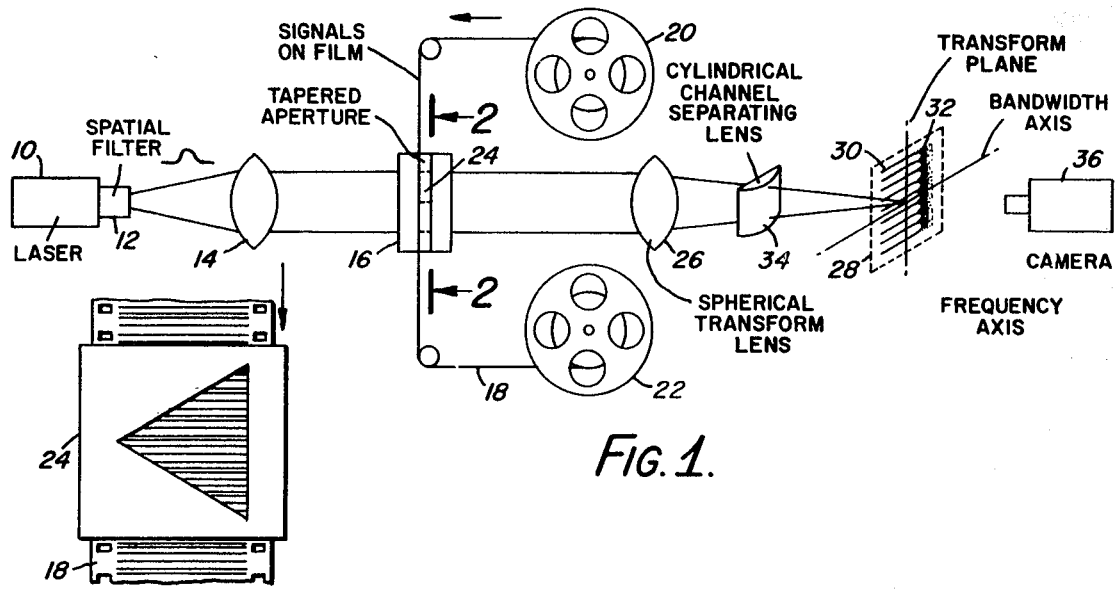
FIG. 1 is a schematic diagram illustrating a signal analyzer provided by the invention.

Referring to FIG. 1, a laser 10 or some other source of monochromatic light, desirably having a spacial filter 12, which provides an intensity characteristic across the diameter of the beam, as shown immediately above the spacial filter 12, is provided. A collimator in the form of a collimating lens 14 projects the beam through a gate 16. The gate is part of a light beam modulator which modulates the beam, both in time and spatially in accordance with the signal to be analyzed. This signal may be recorded on a transparency, such as a film 18 which also provides part of the modulator and which is transported across the beam at a constant rate from a supply reel 20 to a takeup reel 22.

Figure 2:
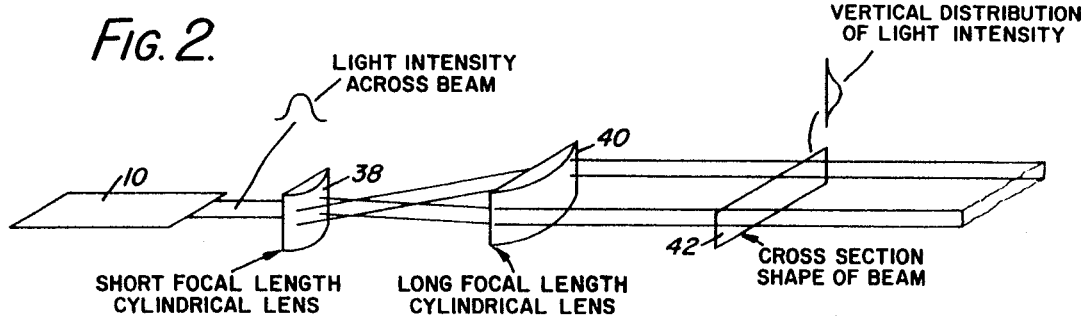
FIG. 2 is a sectional view along the line 2—2 in FIG. 1.

The beam is also processed by passing it through a tapered aperture 24, more clearly shown in FIG. 2. This aperture has a pointed end at one side of the beam and flares to a large end at the opposite side of the beam. In effect, the processing aperture 24 simultaneously provides time samples, in optical form, of the signal recorded on the film 18. The samples vary in length from the pointed end to the wide end of the aperture 24. Thus, when the modulated beam is imaged by means of a spherical transform lens 26, at a Fourier transform plane 28, the display contains (a) a plurality of sharply defined spectral lines 30 showing the Fourier components of the signal, and (b) a variable light intensity at the side of the plane which images light from the narrowest part of the aperture 24 which is a function of the original signal amplitude but contains no frequency information. This light intensity varies with the amplitude variation in the signal as a function of time (viz the rate of movement of the beam across the narrowest part of the aperture). The Fourier transform provides a continuous range of different analyzing bandwidths as a function of the width of the aperture. The finest resolution is being provided by the light which passes through the longest portion of the aperture. Thus, the system provides the equivalent of a large bank of filters, each having varying bandwidths.

In order to separate the channels of differing bandwidths, (viz provide channel isolation) the cylindrical channel-separating lens 34 is provided. This lens is desirably a compound lens disposed closely adjacent to the spherical transform lens 26. Desirably, also the focal length of the cylindrical lens 34 is the same as the focal length of the spherical lens. Thus, the cylindrical lens (combined with the spherical lens) will image the cross section of the beam at the aperture 24 at the transform plane 28 when the distance between the aperture and the lens system of the lenses 26 and 34 is equal to the distance between the lens system of lenses 26 and 34 and the transform plane and that distance is equal to twice the effective focal length of the combined lenses. Both distances are equal to the focal length of either of the lenses 26 and 34 alone. Thus, the cylindrical lens forms separate images (viz vertical lines) at different locations along the horizontal axis of the display. The horizontal distance along the centerline of the display is therefore the bandwidth axis and the vertical distance from this horizontal centerline to a selected spot of light is a measure of the frequency of the particular Fourier component of the signal under test which is recorded on the film then passing through the aperture 24. Along the horizontal bandwidth axis, the frequency resolution varies continuously from wideband on the right side to a very fine or narrow band on the left side of the transform plane, as viewed in FIG. 1.

The right side of the aperture 24 is long in the direction of the film travel. The left side of the aperture is quite short, thus at the pointed edge of the aperture, an instantaneous sample of the signal is provided. The analysis is therefore of a long sample of the signal on the right, a very very short sample on the left, and a continuous variation of sample lengths in between. This results in the variation of frequency resolution in the Fourier transform plane 28.

The system shown in FIGS. 1 and 2 may also be explained as follows: The input signal is converted by the optical modulation process from its original electrical prime function $f(t)$ into a spacial function $f(x)$. This process may be accomplished in real time; the transparency 18 being one way of providing the modulation of the light beam diffraction cells are another. The transparency is located one focal length from the transform lens 26. At the back focus of the lens, the light amplitude distribution is a true analog representation of the Fourier transform of $f(x)$. The relationship between the light distribution $\upsilon$ and $f(x)$ is $$\upsilon(\xi) = C \int_{-\infty}^{+\infty} f(x) e^{-j\frac{K\xi x}{f}} dx \quad (1)$$

where C is a constant of proportionality $k$ is equal to 2 $(\pi 1\lambda)$ $\lambda$ is equal to the wavelength of the light from the monochromatic source 10.

$x$ is the distance from the optical axis vertically along the transparency 18, and $\xi$ is the distance in the same direction as $x$ in the Fourier transform plane.

The Fourier transform with respect to time is represented by the following equation:

$$Z(\omega) = \frac{1}{2\pi} \int_{-\infty}^{+\infty} f(t) e^{-j\omega t} dt \quad (2)$$

$k\xi/f$ in the light distribution equation (1) is analogous to $(\omega)$ in the time function of equation (2).

The foregoing relationships repeat themselves in the y or horizontal dimension, thus providing the separate analyzing channels of different bandwidths.

For a more permanent record of the signal spectrum, the display may be recorded either along the vertical lines in the transform planes, or as a whole by means of a camera 36. The camera may be scanned to record each of the vertical lines successively, if a line-by-line display is desired to be recorded. Alternatively, lines of photodiodes located along vertical lines at different positions along the bandwidth axis could be used to obtain the desired outputs for recording spectrum variations with different resolutions.

Figure 3:
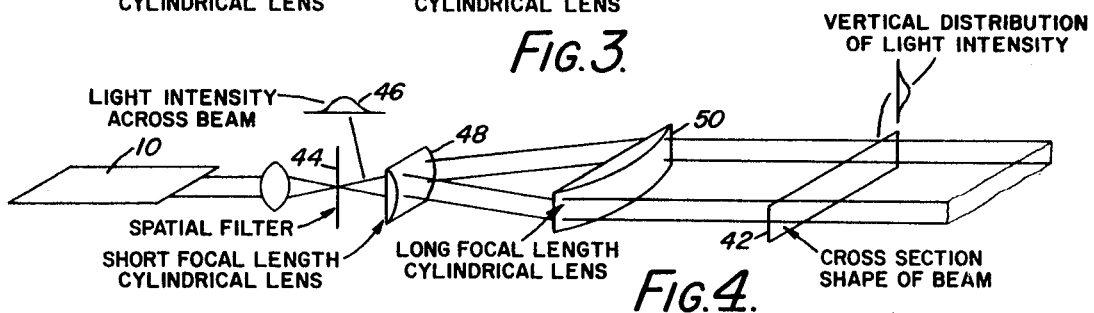
FIG. 3 is a perspective view of a beam-collimating system which may be used in the system of FIG. 1.

FIG. 3 shows a collimating system which may be provided between the laser 10 and the gate 16 in lieu of the lens 14. Two cylindrical lenses 38 and 40 change the round laser beam into a beam that is rectangular in shape and is narrow in the vertical direction, while being wide in the horizontal direction. In order to eliminate fringing in the spectral lines 30, it is desirable that the beam intensity be shaped, as shown in FIG. 3, to provide a shape, as shown adjacent to the cross-sectional shape 42 of the beam in FIG. 3. This shading of the edges is known as apodization.

Figure 4:
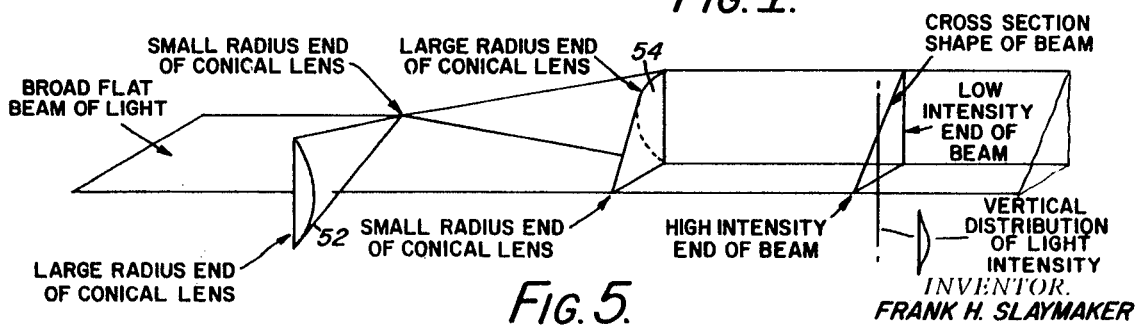
FIG. 4 is a perspective view of another beam-collimating system which provides a desired light distribution across the cross-sectional area of the beam.

In FIG. 4, the same beam shape 42, as shown in FIG. 3, is provided. Thus, a spacial filter in the form of a pinhole in disc 44 is provided which removes random irregularities in the beam and shapes the light distribution of the laser beam into an intensity distribution 46, as shown immediately above the filter 44 in FIG. 4. As in FIG. 3, a pair of cylindrical lenses 48 and 50 provide the rectangular beam shape 42.

Figure 5:
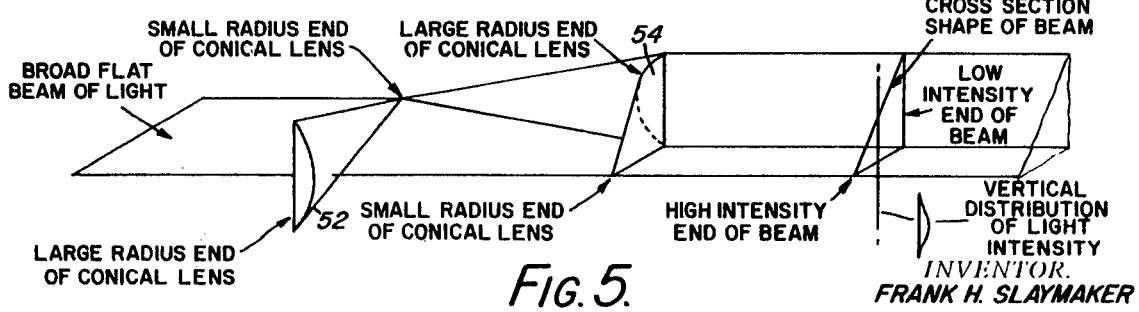
FIG. 5 is still another collimating system which provides a different light distribution across the cross section of the beam.

FIG. 5 illustrates the collimating system which compensates for a lack in uniformity in light intensity across the transform plane 28 by virtue of the shape of the aperture 24. It is desirable to shade the light intensity so as to make the intensity more high at the side of the beam cross section which passes through the pointed end of the aperture 24 and reduces the intensity of the beam gradually therefrom in accordance with the size of the aperture to a low-intensity at the beam side which passes through the wide portion of the aperture. Such shading will provide a more uniform display. Also, as described in FIGS. 3 and 4, the tapering off of the light at the aperture edges (apodization) reduces the fringing in the system shown in FIG. 5. A broad flat beam of light, such as may be produced by the collimating systems of FIGS. 3 or 4 is passed through a conical lens 52 having its small radius end on the opposite side of the beam from that side which passes through the pointed end of the aperture 24. Another conical lens 54 is disposed in the beam path but reverse with respect to the lens 52. Thus, the beam which is shaped by these two lenses will vary in intensity with the high-intensity end complementary to the pointed edge of the aperture 24 and the low-intensity end complementary to the wide side of the aperture 24. The lenses 52 and 54 combine with the tapered edge beam from FIGS. 3 and 4 to provide for the vertical distribution of light intensity required to minimize fringing.

From the foregoing description, it will be apparent that there has been provided an improved optical signal analyzer which provides not only a single resolution frequency spectrum of the signal under test, but rather a wide range of resolutions across a display, as well as a simultaneous display of the amplitude/time characteristics of the signal under test. While an illustrative system embodying the invention, as well as different collimating systems which may be useful therein, have been described, it will be appreciated that other variations and modifications within the scope of the invention will become apparent to those skilled in the art (e.g. use of a modulator which varies the phase of the light in the beam of the type discussed in my above-referenced patent). Accordingly, the foregoing description should be taken as illustrative and not in any limiting sense.

What is claimed is:

1. A signal analysis system which comprises
   a. means for providing a beam of light,
   b. means in the path of said beam for modulating said beam in accordance with the signal to be analyzed,
   c. means for imaging said modulated beam at a Fourier transform plane, and
   d. means disposed ahead of said imaging means in the path of said beam for processing said modulated beam for providing a simultaneous display of the frequency spectrum of said signal and the time amplitude characteristic of said signal at said transform plane, said frequency spectrum having varying bandwidth resolution in one dimension across said plane.

2. The invention as set forth in claim 1 wherein said beam has a certain cross-sectional area, said modulating means being operative to vary the intensity of said beam in one direction across said area thereof as a time function of said signal, whereby said display varies in a direction perpendicular to said one direction to show the Fourier components of the spectrum of said signal at one side of said display and the amplitude/time characteristic of said signal at the other side of said display.

3. The invention as set forth in claim 2 wherein said processing means provides time-varying samples of said modulated beam which vary in length as a function of distance in said perpendicular direction across said cross-sectional area of said beam.

4. The invention as set forth in claim 1 wherein said processing means is a member having a tapered aperture for the passage of said beam to said imaging means.

5. The invention as set forth in claim 4 wherein said modulating means includes means for changing the spacial pattern represented by said beam at a constant rate.

6. The invention as set forth in claim 5 wherein said light-intensity-changing means comprises a transparency on which said signal is recorded as a variably density record, and means for transporting said transparency across said beam.

7. The invention as set forth in claim 1 wherein said imaging means includes a spherical lens and a cylindrical lens.

8. The invention as set forth in claim 7 wherein said spherical and cylindrical lenses are disposed with the axis of the cylinder of said cylindrical lens perpendicular to the axis of said spherical lens and closely adjacent to each other, said lenses having approximately the same focal length.

9. The invention as set forth in claim 1 wherein said light beam is provided by a source of monochromatic light.

10. The invention as set forth in claim 9 wherein said processing means is a tapered aperture which comes to a point at one side of the cross section of said beam, and wherein said beam-providing means further comprises optics disposed between said source and said modulating means for collimating said beam with a rectangular cross section with the broad dimension of said cross section extending from the pointed to the wide side of said aperture.

11. The invention as set forth in claim 10 wherein said optics includes lenses for providing a distribution of light intensity across the narrow dimension of said rectangular cross section of said beam, which tapers off at the edges.

12. The invention as set forth in claim 9 wherein said processing means is a tapered aperture which passes a cross-sectional segment of said beam which is triangular in shape, and wherein said beam providing means including optics so that said beam increases in intensity with distance from the wide side of said triangular cross-sectional segment to the point thereof.